(12) United States Patent
Sugimoto et al.

(10) Patent No.: US 11,273,668 B2
(45) Date of Patent: Mar. 15, 2022

(54) OMNIDIRECTIONAL WHEEL

(71) Applicant: WHILL, Inc., Yokohama (JP)

(72) Inventors: Shuntaro Sugimoto, Yokohama (JP); Kazuo Bando, Yokohama (JP)

(73) Assignee: WHILL, Inc., Yokohama (JP)

( * ) Notice: Subject to any disclaimer, the term of this patent is extended or adjusted under 35 U.S.C. 154(b) by 277 days.

(21) Appl. No.: 16/599,402

(22) Filed: Oct. 11, 2019

(65) Prior Publication Data

US 2020/0047548 A1 Feb. 13, 2020

Related U.S. Application Data

(63) Continuation of application No. PCT/JP2018/015294, filed on Apr. 11, 2018.

(30) Foreign Application Priority Data

Apr. 12, 2017 (JP) .............................. JP2017-079204

(51) Int. Cl.
*B60B 19/00* (2006.01)
*B60B 19/12* (2006.01)
*B60B 27/00* (2006.01)

(52) U.S. Cl.
CPC ............ *B60B 19/003* (2013.01); *B60B 19/12* (2013.01); *B60B 27/00* (2013.01); *B60B 2310/213* (2013.01); *B60B 2310/302* (2013.01)

(58) Field of Classification Search
CPC .............................. B60B 19/003; B60B 19/12
See application file for complete search history.

(56) References Cited

U.S. PATENT DOCUMENTS

| 4,715,460 A | 12/1987 | Smith |
| 10,675,912 B1 * | 6/2020 | Liang ...................... B60B 19/12 |
| 2015/0115694 A1 | 4/2015 | Bando et al. |
| 2015/0129327 A1 | 5/2015 | Yoshino et al. |
| 2015/0130260 A1 | 5/2015 | Bando et al. |
| 2017/0210407 A1 | 7/2017 | Warwick et al. |
| 2020/0062031 A1 * | 2/2020 | Murai ................... B60B 19/003 |

FOREIGN PATENT DOCUMENTS

| CN | 1212213 A | 3/1999 |
| CN | 202623789 U | 12/2012 |
| EP | 2868489 A1 | 5/2015 |
| EP | 2871066 A1 | 5/2015 |

(Continued)

OTHER PUBLICATIONS

Chinese Evaluation Report of Utility Model Patent dated Nov. 24, 2020, in connection with corresponding CN Utility Model Patent No. ZL201890000702.1 (11pp., including English translation).

(Continued)

*Primary Examiner* — Jason R Bellinger

(74) *Attorney, Agent, or Firm* — Maier & Maier, PLLC

(57) ABSTRACT

The omnidirectional wheel includes a first support portion which rotates around a rotation axis line, a second support portion which rotates together with the first plate-like member, a number of support shafts respectively supporting a number of rollers, and a number of support plates fixed to the first and the second support portions and which support one or more of the support shafts between the first and second support portions.

24 Claims, 10 Drawing Sheets

(56) References Cited

FOREIGN PATENT DOCUMENTS

| | | | |
|---|---|---|---|
| JP | 2008290638 A | 12/2008 |
| JP | 2014205475 A | 10/2014 |
| JP | 2015-077948 A | 4/2015 |
| JP | 2015085750 A | 5/2015 |
| JP | 2015093513 A | 5/2015 |
| JP | 2015093651 A | 5/2015 |
| JP | 2015-105080 A | 6/2015 |
| WO | 8603132 A1 | 6/1986 |
| WO | 2015197198 A2 | 12/2015 |

OTHER PUBLICATIONS

Japanese Office Action dated Jul. 28, 2020 in corresponding Japanese Application No. 2017-079204; 12 pages, Machine translation attached.
Extended European Search Report dated Nov. 27, 2020, in connection with corresponding EP Application No. 18784358.6; 9 pages.
International Search Report, dated May 22, 2018, from corresponding International Application No. PCT/JP2018/015294, with partial English translation, 4 pages.

\* cited by examiner

OMNIDIRECTIONAL WHEEL

CROSS-REFERENCE TO RELATED APPLICATIONS

This application is based on and claims priority to Japanese Patent Application No. 2017-079204 filed on Apr. 12, 2017, the entire content of which is incorporated herein by reference. This application is based on International Patent Application No. PCT/JP2018/015294 filed on Apr. 11, 2018, the entire content of which is incorporated herein by reference.

FIELD

This invention relates to an omnidirectional wheel.

BACKGROUND

As this kind of omnidirectional wheel, a known omnidirectional wheel includes a plurality of rollers for forming an outer periphery, a plurality of support shafts for respectively supporting the plurality of rollers so as to be rotatable, a plurality of support members for respectively supporting two of the plurality of support shafts, and a pair of plate members which is arranged at an interval in a direction along a rotation axis line of the omnidirectional wheel, and each of which rotates around the rotation axis line, and the support members are formed by cutting a metal block, and the support members are fixed to the pair of plate members by means of a bolt. (See Japanese Unexamined Patent Application, Publication No. 2015-85750, for example.)

Also, as another type of omnidirectional wheel, a known omnidirectional wheel includes a plurality of rollers for forming an outer periphery, a plurality of support frames for respectively supporting the plurality of rollers so as to be rotatable, and a pair of rotation members which is arranged at an interval in a direction along a rotation axis line of the omnidirectional wheel, and each of which rotates around the rotation axis line, and the support frames are formed by cutting a metal block so as to house one of the plurality of rollers, and the support frames are fixed to the pair of rotation members. (See Japanese Unexamined Patent Application, Publication No. 2008-290638, for example.)

And, as another type of omnidirectional wheel, a known omnidirectional wheel includes a plurality of rollers for forming an outer periphery, a plurality of support shafts for respectively supporting the plurality of rollers so as to be rotatable, and a plurality of plate-like members which radially extends from a hub radially outwardly, and the plurality of support shafts are supported at a radial outer end of the plurality of plate-like members. (See WO 86/03132, for example.)

SUMMARY OF INVENTION

A first aspect of the present invention is an omnidirectional wheel whose outer peripheral surface is formed by a plurality of rollers and which rotates around a rotation axis line, the omnidirectional wheel comprising: a first support portion which rotates around the rotation axis line; a second support portion which is arranged at a position apart from the first support portion in a direction along the rotation axis line and which rotates around the rotation axis line together with the first support portion; a plurality of support shafts which support the plurality of rollers; and, a plurality of support plates which are fixed to the first support portion and the second support portion, wherein, one or more of the support shafts are fixed to each of the support plates, one end of each of the support plates in a direction along the rotation axis line is provided with a first fixing portion, and the other end of each of the support plates in the direction along the rotation axis line is provided with a second fixing portion.

DETAILED DESCRIPTION

Figure 1:
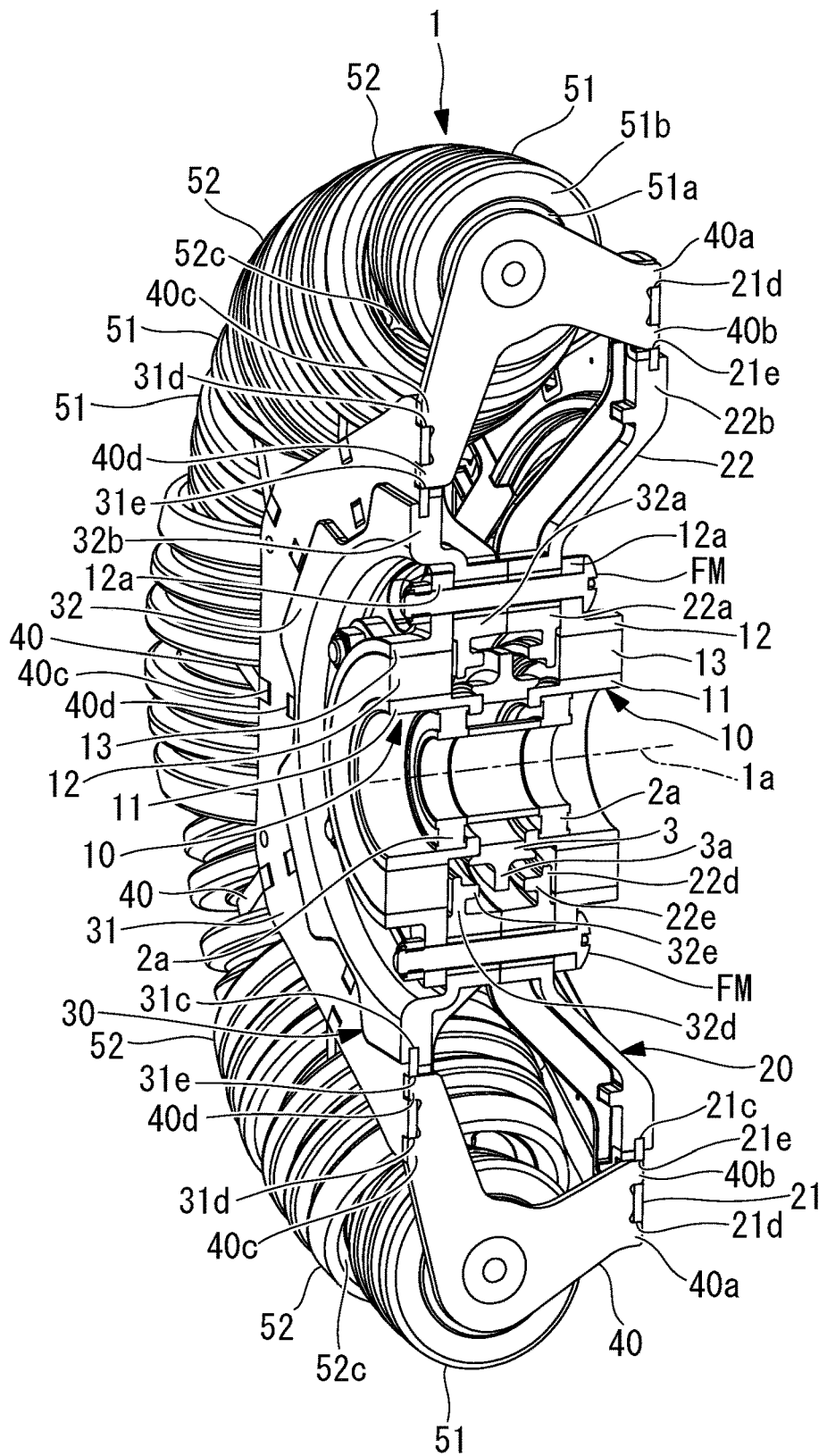
FIG. 1 is a partial sectional perspective view of an omnidirectional wheel according to an embodiment of the present invention.

An omnidirectional wheel 1 according to an embodiment of the present invention will be described below with reference to the accompanying drawings.

As shown in FIGS. 1 to 5, this omnidirectional wheel 1 includes a pair of vibration isolating members 10 arranged in a width direction which is supported by an axle 2 through a pair of bearings 2*a* arranged in the width direction, a first hub member 20 and a second hub member 30, which are fixed to an outer peripheral side of the pair of the vibration isolating members 10, a plurality of support plates 40 which are fixed to the first and the second hub members 20, 30, and a plurality of rollers 51, 52 which are supported by the support plates 40, and for example, this omnidirectional wheel 1 is used as a front wheel of an electric mobility device. It is also possible to use the omnidirectional wheel 1 as a rear wheel of the electric mobility, or a wheel of other vehicles. In the description below, there is a case where a vehicle front-rear direction of the electric mobility device is referred to as front-rear direction, and a vehicle width direction is referred to as width direction.

Figure 7:
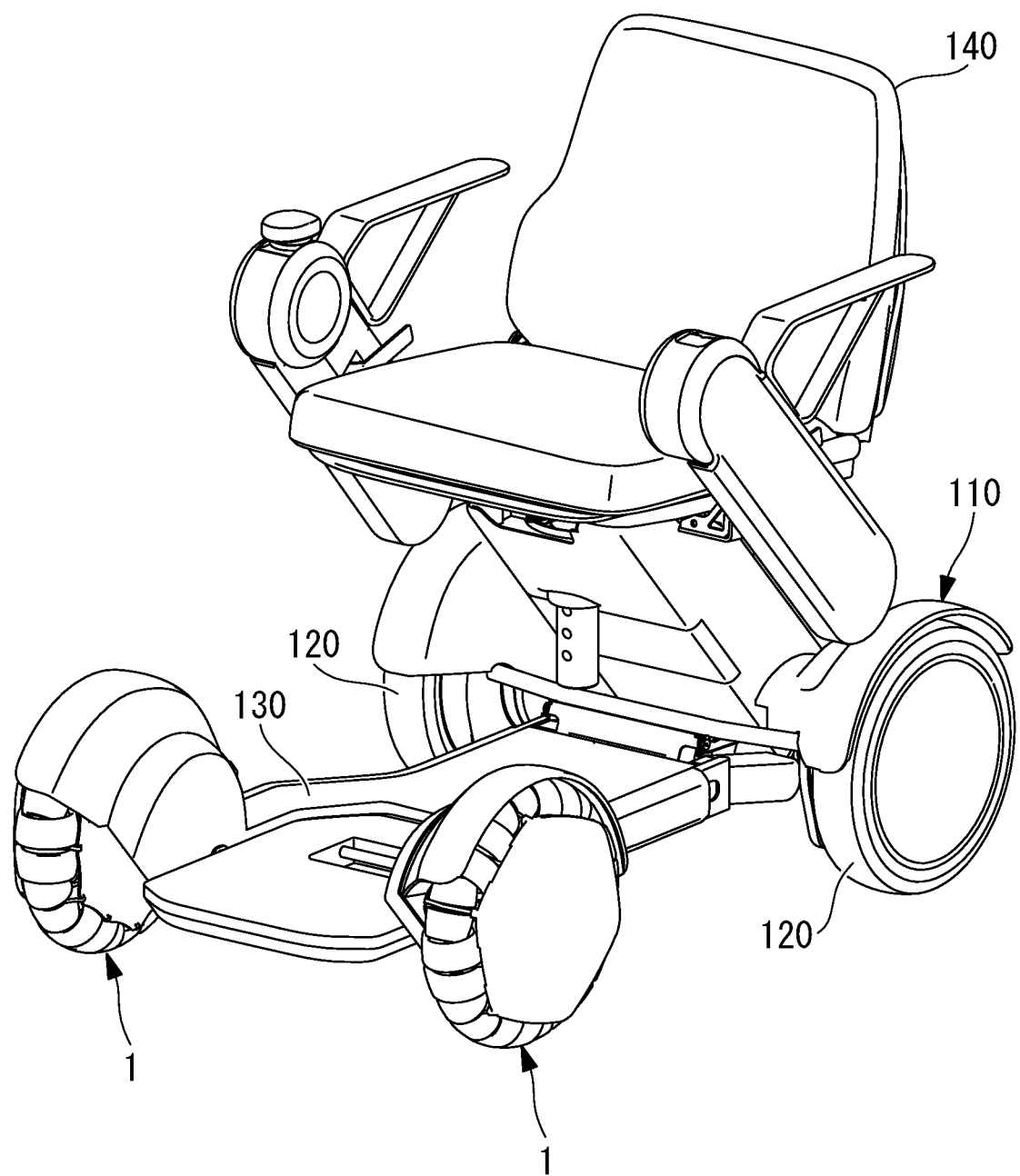
FIG. 7 is a front perspective view of the electric mobility having the omnidirectional wheel of the embodiment attached thereto.
Figure 8:
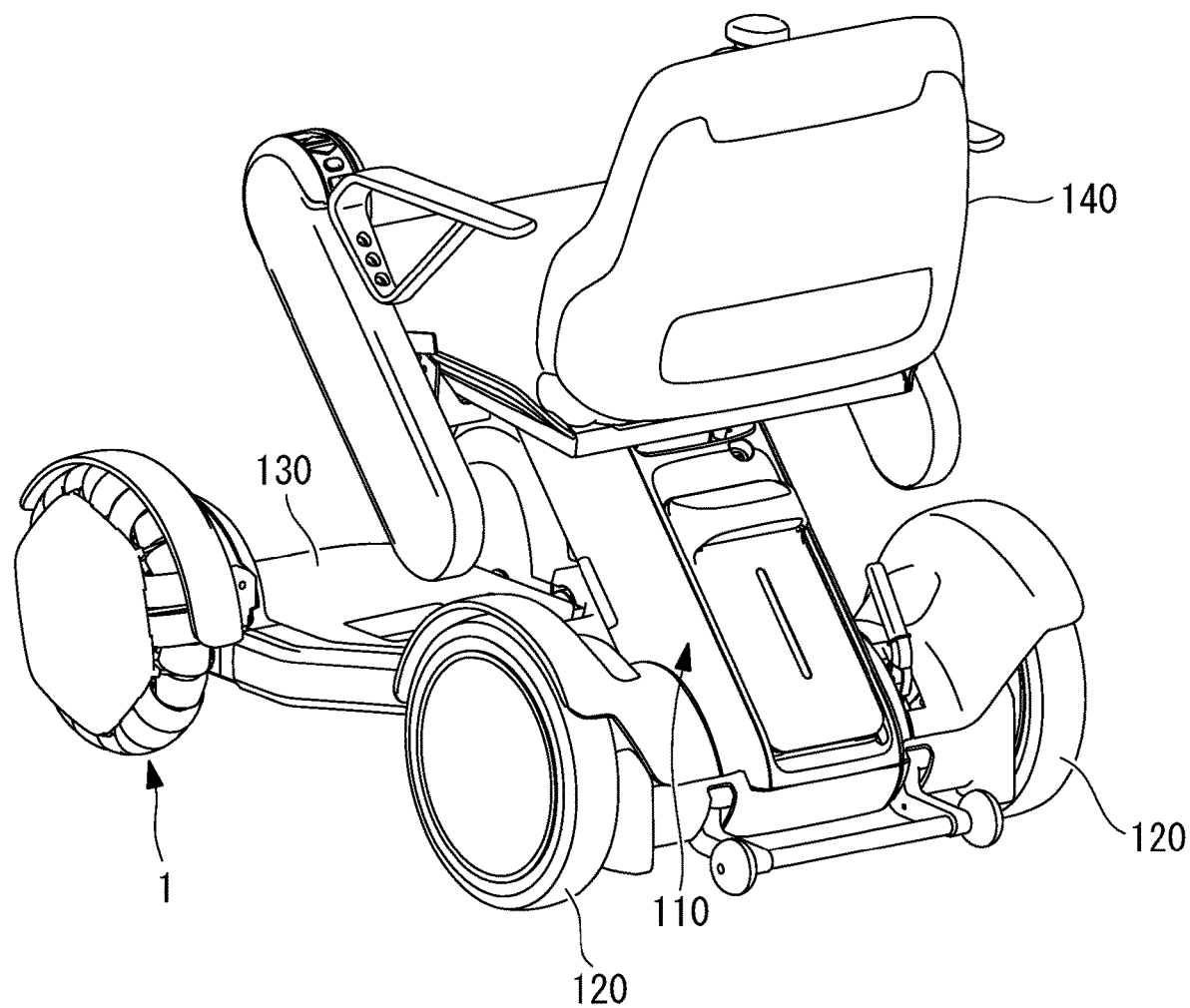
FIG. 8 is a rear perspective view of the electric mobility having the omnidirectional wheel of the embodiment attached thereto.

This electric mobility includes, as shown in FIGS. 7 and 8, for example, a mobility body 110 having the omnidirectional wheel as a front wheel, a rear wheel 120, and a body 130 which is supported by the omnidirectional wheel 1 and the rear wheel 120, a seat unit (seat) 140 which is detachably attached to the mobility body 110, and a drive unit (not shown), such as a motor and the like, which is attached to the mobility body 110, and which drives at least one of the omnidirectional wheel 1 or the rear wheel 120.

Figure 9:
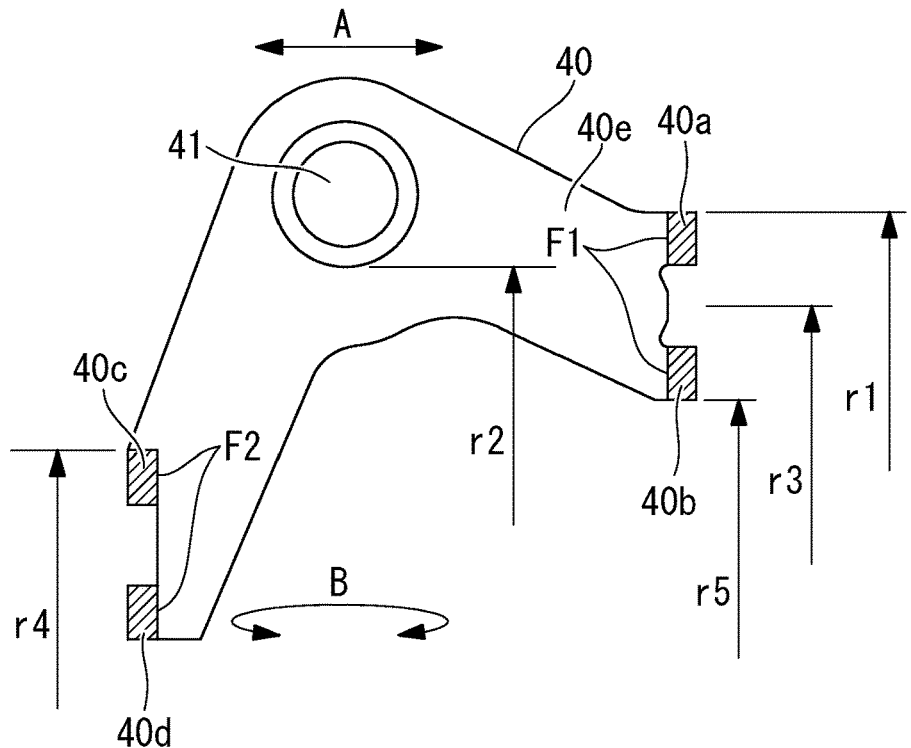
FIG. 9 is a plan view of a support plate which is used for the omnidirectional wheel of the embodiment.
Figure 10:
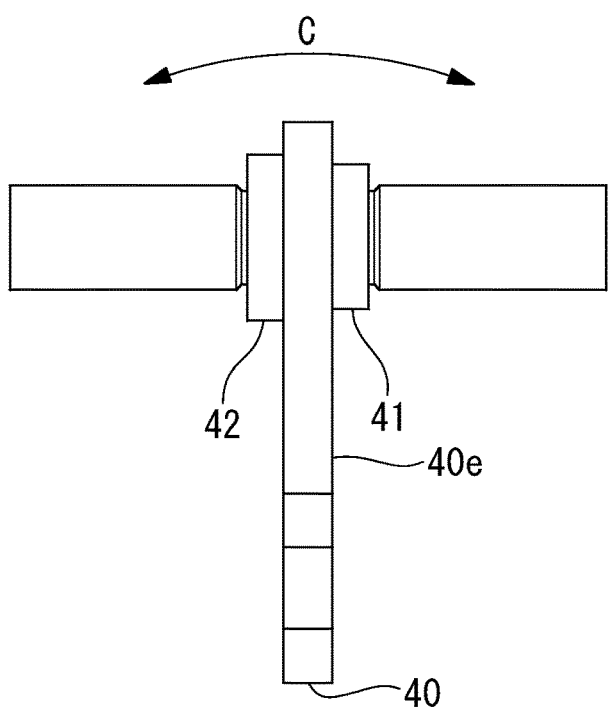
FIG. 10 is a side view of the support plate which is used for the omnidirectional wheel of the embodiment.

An outer peripheral surface of the omnidirectional wheel 1 is formed by the plurality of rollers 51, 52. Each of the support plates 40 is formed by press forming (punching process), and each of the support plates 40 in a plan view has a shape which is shown in FIG. 9. As shown in FIG. 10, a first support shaft 41 which protrudes from one surface in a thickness direction of the support plate 40 to the thickness direction, and a second support shaft 42 which protrudes from the other surface in the thickness direction of the support plate 40 to the thickness direction are fixed to each of the support plates 40.

Figure 6:
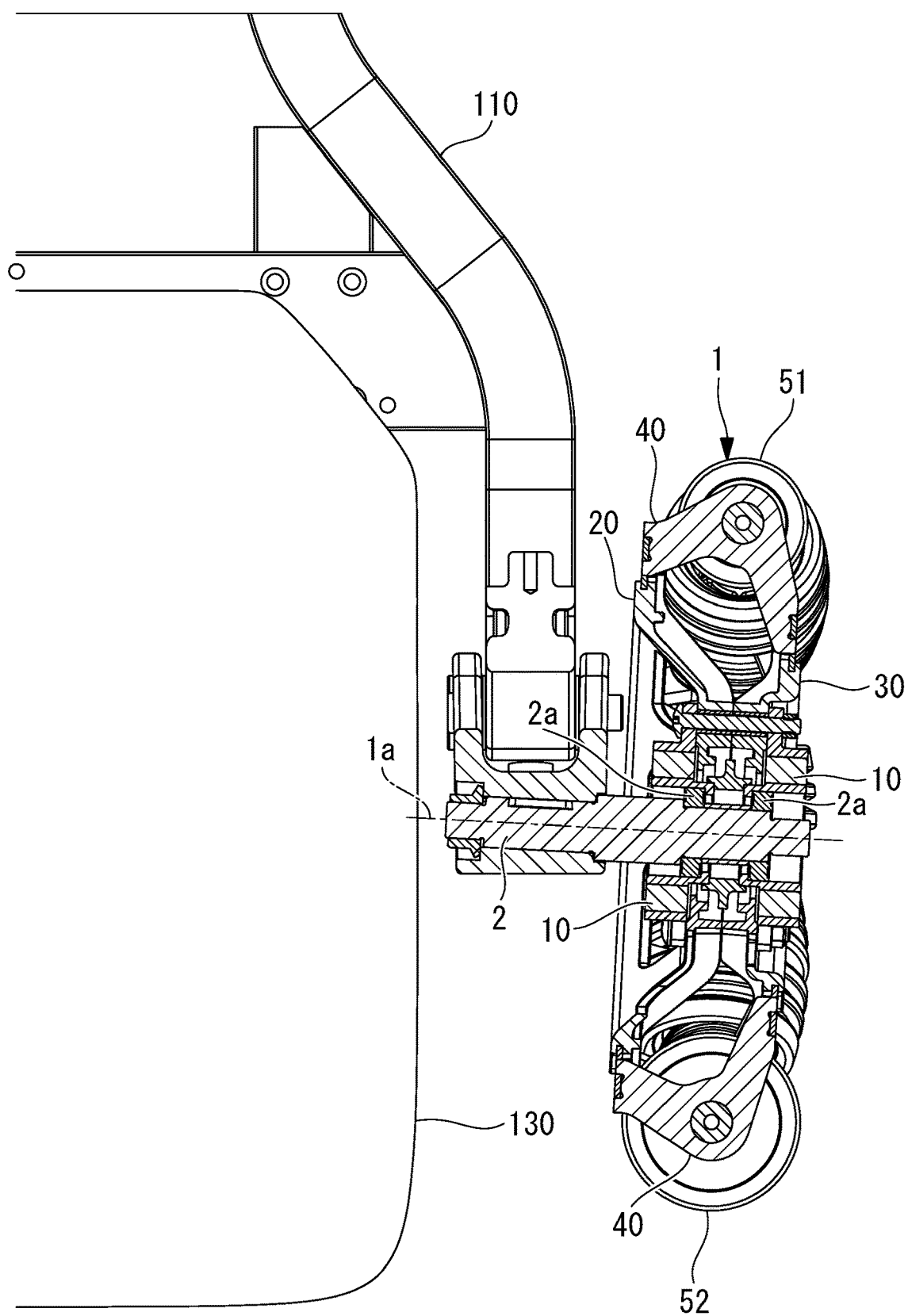
FIG. 6 is a view showing a state where the omnidirectional wheel of the embodiment is attached to an electric mobility.

A central axis line of each of the support shafts 41, 42 is arranged within a vertical surface with respect to a rotation axis line (a central axis line of the axle 2 which is shown in FIG. 6 in this embodiment) la of the wheel, and the central axis line of each of the support shafts 41, 42 extends in a direction orthogonal to a radial direction of the wheel (direction vertical to the rotation axis line 1a).

Figure 2:
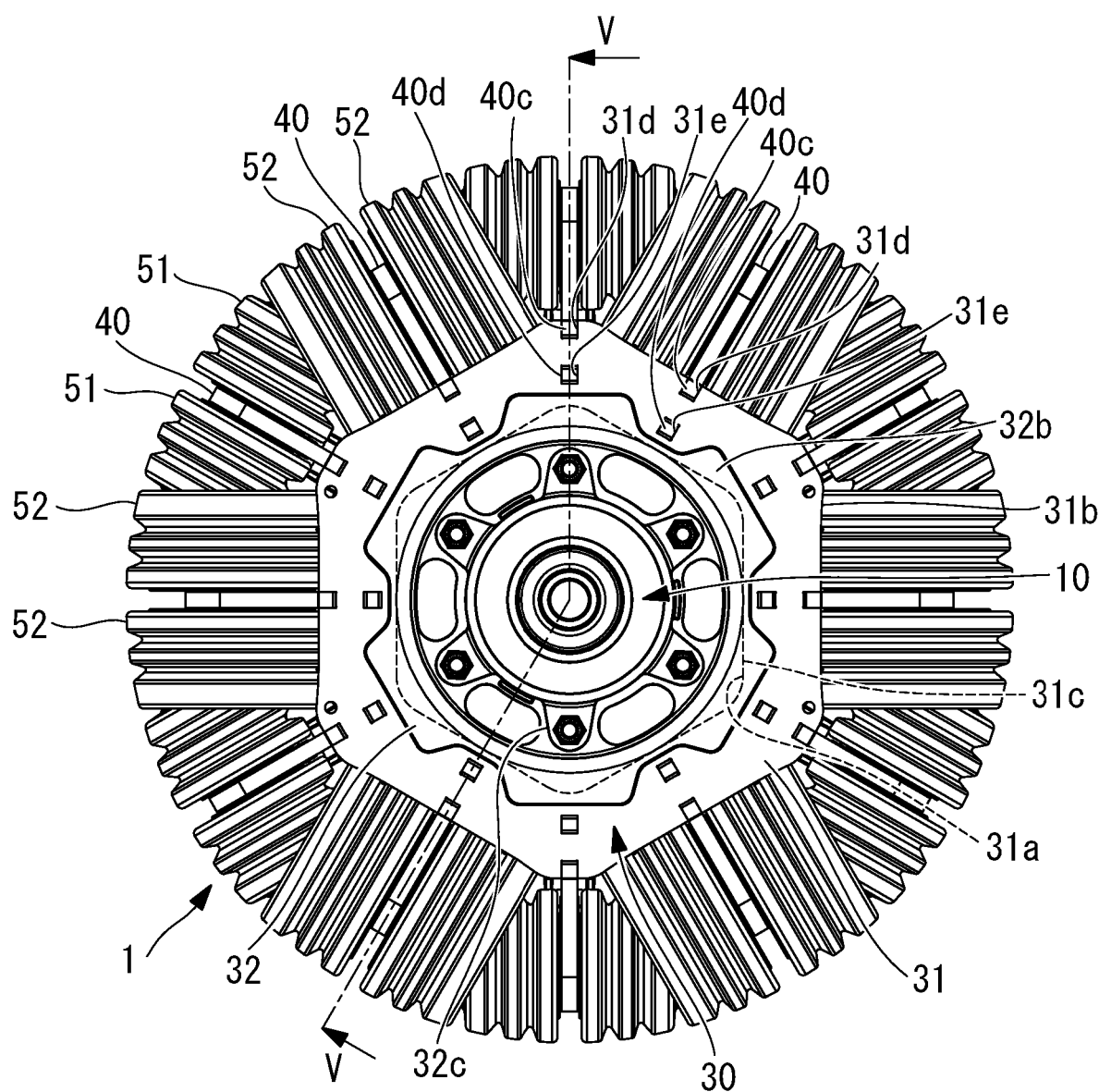
FIG. 2 is a side view of the omnidirectional wheel of the embodiment, which is in a state where the omnidirectional wheel is seen from outside in a vehicle width direction.

Each of the support plates 40 is arranged in a circumferential direction of the wheel, and each of the support plates 40 supports two rollers 51 or two rollers 52. Also, the support plate 40 which supports the pair of the rollers 51 by means of the first and the second support shafts 41, 42, and the support plate 40 which supports the pair of the rollers 52 by means of the first and the second support shafts 41, 42 are alternatively arranged in the circumferential direction of the wheel. That is to say, as shown in FIG. 2 and the like, in the omnidirectional wheel 1, the pair of the rollers 51 and the pair of the rollers 52 are alternatively arranged in the circumferential direction of the wheel.

Also, with the above configuration, each of the rollers 51, 52 is arranged within the vertical surface with respect to the rotation axis line 1a of the wheel, and the rollers 51, 52 can rotate around an axis line which extends in the direction orthogonal to the radial direction of the wheel.

Each of the rollers 51 is formed so that its outer diameter gets gradually smaller from one side along the rotation axis line of the roller 51 toward the other side. More specifically, each of the rollers 51 has a substantially truncated cone shape, and the pair of the rollers 51 is mounted on the first and the second support shafts 41, 42 so that an end surface at a large diameter side of the rollers 51 faces each other.

Each of the rollers 52 is also formed so that its outer diameter gets gradually smaller from one side along its rotation axis line toward the other side. More specifically, each of the rollers 52 has a substantially truncated cone shape, and the pair of the rollers 52 is mounted on the first and the second support shafts 41, 42 so that an end face at a large diameter side of the rollers 52 faces each other. The outer diameter of the roller 52 is larger than that of the roller 51.

Figure 5:
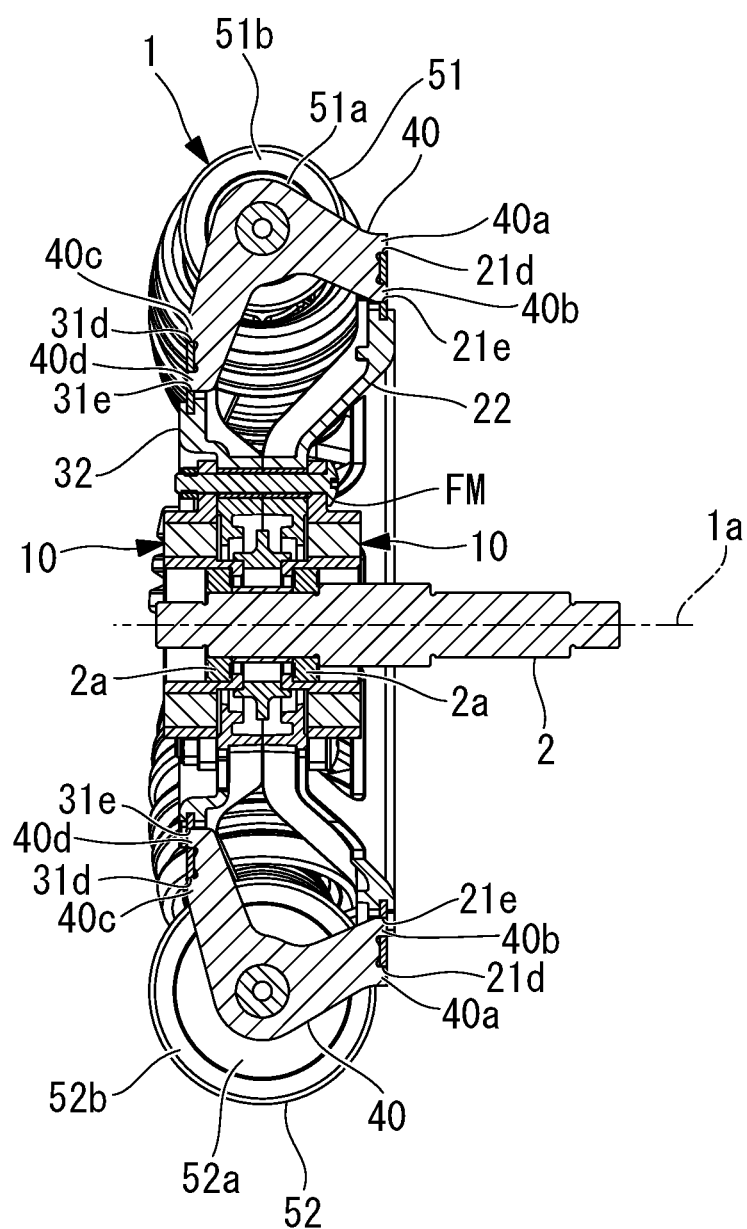
FIG. 5 is a V-V line sectional view of the omnidirectional wheel of FIG. 2.

As shown in FIG. 5, each of the rollers 51, 52 has metallic core members 51a, 52a, and outer peripheral members 51b, 52b which form the outer peripheral surface of each of the rollers 51, 52, and the outer peripheral members 51b, 52b are formed by a material having rubber-like elasticity. Also, a plurality of grooves, each of which extends in the circumferential direction of the roller, are provided at the outer peripheral surface of the outer peripheral members 51b, 52b. Note that, in FIGS. 7 and 8, the grooves are not drawn on the outer peripheral surface of the outer peripheral members 51b, 52b for a reason in drawing the rollers.

Figure 3:
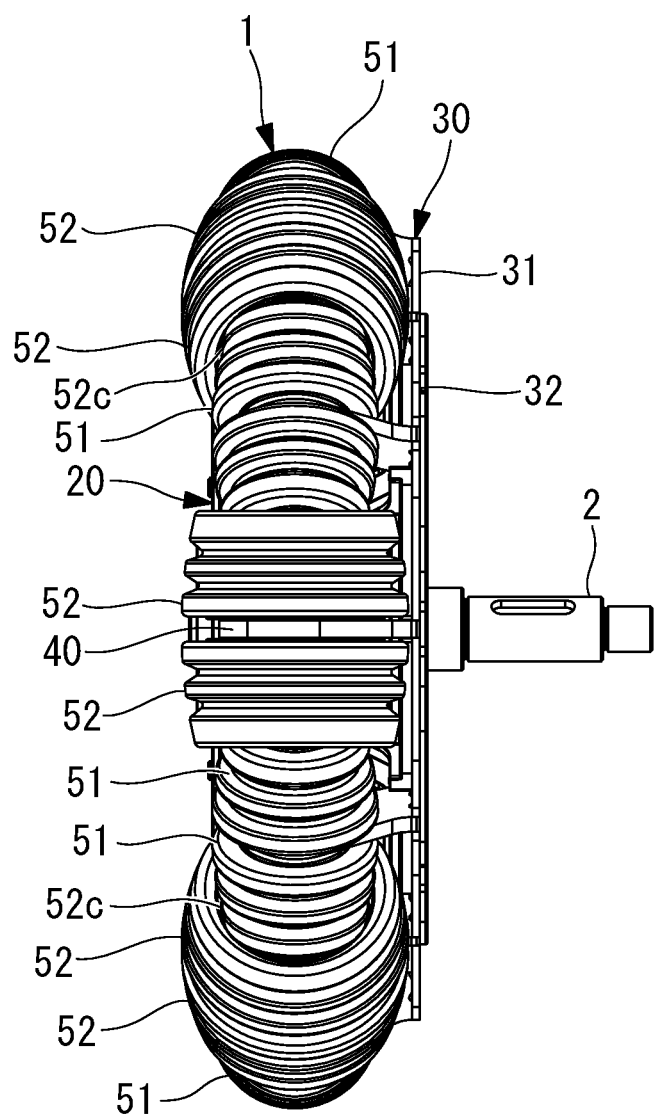
FIG. 3 is a side view of the omnidirectional wheel of the embodiment, which is in a state where the omnidirectional wheel is seen from a rolling direction.

Moreover, as shown in FIG. 3, a concave portion 52c is formed on a small diameter end of each of the rollers 52, which is a large diameter roller, and the rollers 51, 52 are supported by the support shafts 41, 42, respectively, so that a part of the small diameter end of the adjacent roller 51, which is a small diameter roller, is inserted into the concave portion 52c. Since each of the rollers 51, 52 has a substantially truncated cone shape, and since the part of the small diameter end of the roller 51 is inserted into the concave portion 52 of the small diameter end of the roller 52, the outer peripheral surface of the omnidirectional wheel 1 is in a state which is closer to a circular shape.

Figure 4:
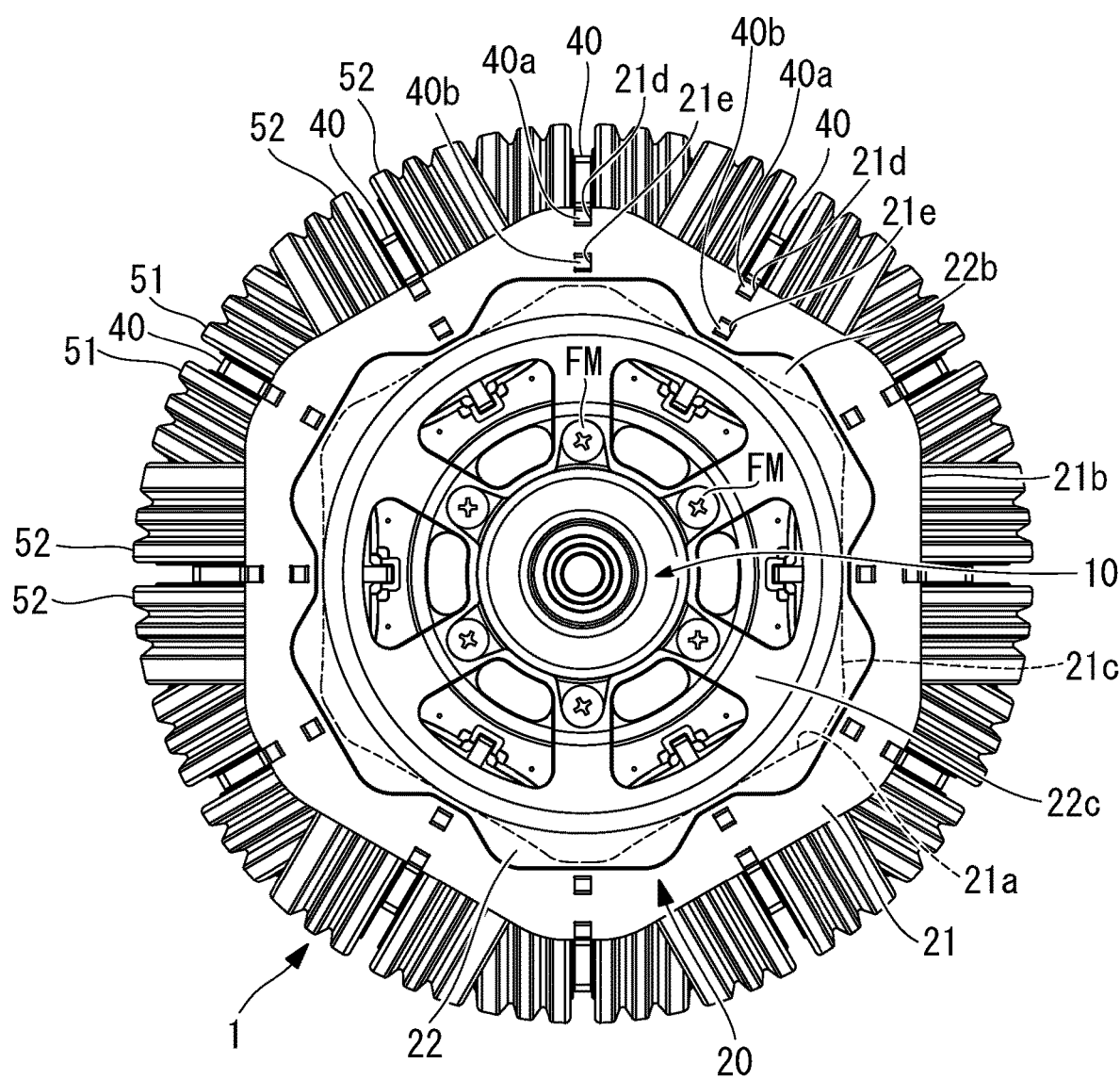
FIG. 4 is a side view of the omnidirectional wheel of the embodiment, which is in a state where the omnidirectional wheel is seen from inside in the vehicle width direction.

As shown in FIG. 4, the first hub member 20 includes a first plate-like member (a first support portion) 21 having a ring shape, which is provided with a hole 21 at its center, and a resin member 22 which is integrally formed with the first plate-like member 21 by insert molding. The first plate-like member 21 has a thickness dimension of several millimeters, and the first plate-like member 21 includes an outer periphery 21b having a polygonal shape (hexagonal shape in this embodiment), and an inner periphery 21c having a polygonal shape (hexagonal shape in this embodiment) which is the same as or similar to the outer periphery 21b, and the first plate-like member 21 is formed by the press forming (punching process).

As shown in FIG. 2, the second hub member 30 includes a second plate-like member (a second support portion) 31 having a ring shape, which is provided with a hole 31a at its center, and a resin member 32 which is integrally formed with the second plate-like member 31 by the insert molding. The second plate-like member 31 has a thickness dimension of several millimeters, and the second plate-like member 31 includes an outer periphery 31b having a polygonal shape (hexagonal shape in this embodiment), and an inner periphery 31c having a polygonal shape (hexagonal shape in this embodiment) which is the same as or similar to the outer periphery 31b, and the second plate-like member 31 is formed by the press forming (punching process).

In this embodiment, an outer periphery 31b of the second plate-like member 31 is formed when a hole 21a of the first plate-like member 21 is formed by punching a plate material. That is to say, the second plate-like member 31 is formed by using the plate material which is punched out for producing the hole 21a of the first plate-like member 21. Therefore, a shape of the outer periphery 31b of the second plate-like member 31 is smaller in a radial direction than the hole 21a of the first plate-like member 21.

The resin members 22, 32 are made of a reinforced plastic containing a reinforcing material such as carbon fibers, glass fibers, and the like, and as shown in FIGS. 1, 5, and the like, the resin members 22, 32 include inner peripheral portions 22a, 32a which are continuous in the circumferential direction, outer peripheral portions 22b, 32b which are continuous in the circumferential direction, and which are fixed to the first or the second plate-like member 21, 31, and a plurality of spoke portions 22c, 32c which connect the inner peripheral portions 22a, 32a and the outer peripheral portions 22d, 32d. The inner peripheral portions 22a, 32a include circular-plate portions 22d, 32d which are arranged to oppose to each other, and protruding portions 22e, 32e which extend from the circular-plate portions 22d, 32d in a direction approaching to each other.

Each of the vibration isolating members 10 includes an inner ring 11 having a cylindrical shape, which is made of a metal, an outer ring 12 having a cylindrical shape, which is made of a metal, and which is arranged at an outer peripheral side of the inner ring 11, and a shock absorbing member 13 having a ring shape, which is arranged between the inner ring 11 and the outer ring 12, and which is made from a material having rubber-like elasticity. An inner peripheral surface of the shock absorbing member 13 is fixed to the inner ring 11 by means of vulcanized adhesion and the like, and an outer peripheral surface of the shock absorbing member 13 is also fixed to the outer ring 12 by the vulcanized adhesion and the like. The inner rings 11 of the pair of the vibration isolating members 10 are fixed to an outer ring of the bearing 2a, respectively.

The outer ring 12 is provided with a flange portion 12a extending from the outer peripheral surface of the outer ring 12 in a radially outward direction of the wheel. The inner peripheral portions 22a, 32a of the plate-like members 21, 31 are arranged between the flange portions 12a of the pair of the vibration isolating members 10, and the inner peripheral portions 22a, 32a are fasten by a plurality of bolts (fastening members) FM together with the pair of flange portions 12a. By this, the first and the second hub members 20, 30 are fixed to the outer peripheral side of the pair of vibration isolating members 10.

Also, as shown in FIG. 1, a ring 3, which is made of a metal, is supported by the inner ring 11 of the pair of vibration isolating members 10, the ring 3 is provided with a protruding portion 3a having a disk shape, which extends from the outer peripheral surface of the ring 3 in a radially outward direction. As described above, when the first and the second hub members 20, 30 are fixed to the outer peripheral side of the pair of vibration isolating members 10, the protruding portion 3a is arranged between the protruding portions 22e, 32e of the first and the second hub members 20, as shown in FIG. 5. An inner diameter of each of the protruding portions 22e, 32e is smaller than an outer diameter of the protruding portion 3a.

With the above described configuration, in such a case where the shock absorbing member 13 is broken, the protruding portions 22e, 32e are caught on the protruding portion 3a, which prevents the first and the second hub members 20, 30 from falling off from the wheel 2.

On the other hand, a space is provided between the protruding portion 3a and the protruding portions 22e, 32e in a direction along the rotation axis line 1a, therefore, in such a case where the shock absorbing member 13 is elastically deformed for absorbing shocks, contact of the protruding portion 3a with the protruding portions 22e, 32e is prevented or reduced.

As shown in FIG. 4, a plurality of notches 21d are provided at the outer periphery 21b of the first plate-like member 21 at an interval in the circumferential direction, and a plurality of holes 21e are provided at the inner periphery side 21c at an interval in the circumferential direction. Each of the notches 21d and the holes 21e penetrates the first plate-like member 21 in the plate thickness direction.

Also, as shown in FIG. 2, a plurality of notches 31d are provided at the outer periphery 31b of the second plate-like member 31 at an interval in the circumferential direction, and a plurality of holes 31e are provided at the inner periphery side 31c at an interval in the circumferential direction. Each of the notches 31d and the holes 31e penetrates the second plate-like member 31 in the plate thickness direction.

On the other hand, as shown in FIGS. 9 and 10, at one end of each of the support plates 40 in a direction which is along the rotation axis line 1a of the wheel, two protruding portions 40a, 40b are provided at an interval in the radial direction of the wheel, and at the other end of each of the support plates 40 in the direction along the rotation axis line 1a of the wheel, two protruding portions 40c, 40d are provided at an interval in the radial direction of the wheel.

As shown in FIGS. 1, 2, 4, 5, and the like, the protruding portions 40a, 40b, 40c, 40d are respectively inserted into the notches 21d, the holes 21e, the notches 31d, and the holes 31e, and fixed to the first plate-like member 21 or the second plate-like member 31 by means of welding and the like.

That is to say, in the support plate 40, the protruding portions 40a, 40b function as a first fixing portion F1 which is fixed to the first plate-like member 21 in the support plate 40, and the protruding portions 40c, 40d function as a second fixing portion F2 which is fixed to the second plate-like member 31.

In FIG. 9, hatching areas are areas providing a function as the first fixing portion F1 and the second fixing portion F2. Therefore, in the direction along the rotation axis line 1a, the support shafts 41, 42 are respectively arranged between the first fixing portions F1 and the second fixing portions F2.

On the other hand, the notches 21d and the holes 21e of the first plate-like member 21 function as a fixed portion for fixing the first fixing portion F1, and the notches 31d and the holes 31e of the second plate-like member 31 function as a fixed portion for fixing the second fixing portion F2.

With the above configured omnidirectional wheel, the wheel rolls in a direction orthogonal to the rotation axis line 1a by rolling of the entire wheel, and the wheel also moves in the direction which is along the rotation axis line 1a by rotation of each of the rollers 51, 52.

In this embodiment, the first and the second plate-like members 21, 31 are arranged at an interval in the direction which is along the rotation axis line 1a, and the support shafts 41, 42 are supported between the first and the second plate-like members 21, 31 by the support plates 40. This configuration is advantageous for suppressing deformation of each of the support plates 40 in a vehicle width direction (direction indicated by the arrow A in FIG. 9), which is caused by force applied to each of the rollers 51, 52, and it is also advantageous for suppressing deformation of each of the support plates 40 in a rotation direction around the radial direction of the wheel (direction indicated by the arrow B in FIG. 9).

Also, as shown in FIG. 9, a radial directional position r1 (position in the radial direction with regard to the rotation axis line 1a) of an outer end of the first fixing portion F1 of each of the support plates 40 is arranged outside in the radial direction with respect to a radial directional position r2 of a radial inner end of a support-plate-side end portion of the support shafts 41, 42 which are fixed to each of the support plates 40. Therefore, it is advantageous for surprising deformation of each of the support plates 40 in a rotational direction around an axis line extending in the vehicle width direction (direction indicated by the arrow c in FIG. 10), which is caused by the force applied to each of the rollers 51, 52. This configuration is advantageous for making plate thickness of the support plate 40 thinner.

And, in this embodiment, as shown in FIG. 9, a radial directional position r3 of a central position in the radial direction of the first fixing portion F1 (radial direction with regard to rotation axis line 1a) is positioned outside in the radial direction with respect to a radial directional position r4 of the outer end in the radial direction of the second fixing portion F2.

As described above, since the first fixing portion F1 is positioned outside in the radial direction with respect to the second fixing portions F2, at the support-plate-side end portion in the support shafts 41, 42, which are fixed to each of the support plates 40, for example, as shown in FIGS. 9 and 10, in the support shaft 41 which protrudes from one surface 40e of the support plate 40 in a thickness direction, a radially inside position r2 of a portion which is closest to the one surface 40e in the thickness direction (left end portion of the support shaft 41 shown in FIG. 10) and the position of the first fixing portion F1 in the radial direction (position of the outer end of the first fixing portion F1 for example) can get closer or the same. This configuration is advantageous for suppressing the deformation of each of the support plates 40 in the rotation direction (direction indicated by the arrow c in FIG. 10) around the axis line which extends in the vehicle width direction, which is caused by the force applied to the rollers 51, 52.

Also, in FIG. 9, a radial directional position r4 of the outer end of the second fixing portions F2 is formed smaller with respect to a radial directional position r5 of the inner end in the radial direction of the first fixing portions F1, however, the radial directional position r5 and the radial directional position r4 may be the same. With this configuration, the first fixing portions F1 are positioned outside in the radial direction with respect to the second fixing portions F2 more obviously, which is advantageous for suppressing deformation of each of the support plates 40 in the rotation direction around an axis line extending in the vehicle width direction (direction indicated by the arrow C in FIG. 10), which is caused by the force applied to each of the rollers 51, 52.

Also, since the hole 21a is provided at the center of the first plate-like member 21, and the second plate-like member 31 has a shape which can be inserted into the hole 21a of the first plate-like member 21, it is possible to form the first and the second plate-like members 21, 31 by the press forming, and at that time, the second plate-like member 31 can be formed by using a plate material which is punched out for producing the hole 21a at the center of the first plate-like member 21.

And, the first plate-like member 21 is arranged at inside in the vehicle width direction with respect to the second plate-like member 31. Since the first plate-like member 21 needs to fix the first fixing portions F1 at the outside in the radial direction, the first plate-like member 21 is positioned outside in the width direction with respect to each of the rollers 51, 52, as shown in FIG. 3. In contrast, since it is possible to form the second plate-like member 31 so as to be smaller in diameter than the first plate-like member 21, the second plate-like member 31 can be formed so as to be arranged at inside in the width direction with respect to each of the rollers 51, 52, as shown in FIG. 3.

With this configuration, in such a case when the omnidirectional wheel 1 comes into contact with an obstacle which is positioned outside in the width direction of the omnidirectional wheel 1, it is possible to prevent the second plate-like member 31, which is hard, from coming into contact with the obstacle as much as possible before the rollers 51, 52.

Also, the shock absorbing member 13 is provided between the axle 2, and the first plate-like member 21 and the second plate-like member 31. Therefore, the shock absorbing member 13 reduces vibration generated between a contact surface and each of the rollers 51, 52, and the like, and the reduced vibration is transmitted to the axle 2, which is advantageous for reducing the vibration of the vehicle.

Moreover, the first and the second plate-like member 21, 31 are formed together with the resin members 22, 32 by the insert molding, and the resin members 22, 23 are supported by the outer portion of the shock absorbing member 13. Therefore, even in such a case where the first and the second plate-like members 21, 31 are made from a metal so as to enhance strength, weight of the omnidirectional wheel 1 can be reduced by using the resin members 22, 32.

Also, as shown in FIGS. 2, 4, and the like, radial directional positions of the first and the second fixing portions F1, F2 of the support plate 40 which supports the roller 52, which is the large diameter roller, are positioned inside in the radial direction with respect to a radial direction positions of the first and the second fixing portions F1, F2 of the support plate 40 which supports the roller 51, which is the small diameter roller. Therefore, it is possible to support the rollers 51, which are the small diameter roller, and the rollers 52, which are the large diameter roller, by using the plurality of the support plates 40 having the same shape.

In addition, the support plate 40 which supports the roller 51 and the support plate 40 which supports the roller 52 can be made different, however, it is preferable to use the same support plates 40 as described above.

Figure 11:
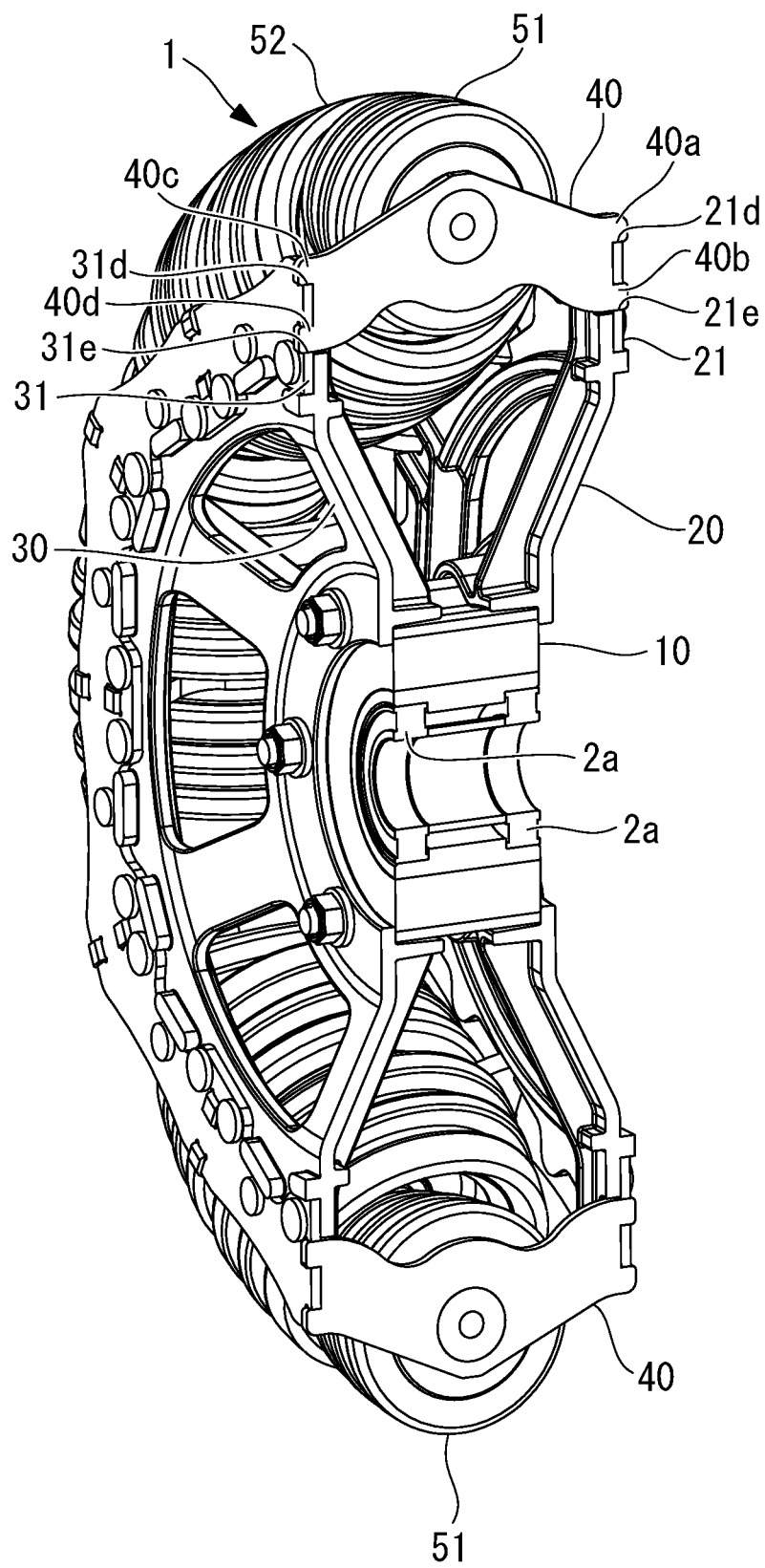
FIG. 11 is a partial sectional perspective view showing a modified example of the omnidirectional wheel of the embodiment.

Also, an outline of the second plate-like member 31 may be much smaller with respect to the hole 21a of the first plate-like member 21. On the other hand, the second plate-like member 31 may have a shape which cannot be inserted into the hole 21a of the first plate-like member 21. For example, as shown in FIG. 11, the second hub member 30 has the same configuration with the first hub member 20, and the shape of the support plate 40 can be changed so as to match the configuration of the first and the second hub members 20, 30.

Also, this embodiment shows the first fixing portion F1 which has the protruding portions 40a, 40b, and the second fixing portion which has the protruding portions 40c, 40d. Whereas, it may be possible that the first fixing portion F1 has a protruding portion having a shape that the protruding portions 40a, 40b are continuous with each other, and the second fixing portion F2 has a protruding portion having a shape that the protruding portions 40c, 40d are continuous with each other.

And, it is also possible to form the support plates 40 by other machining method such as forging, cutting, and the like, and it is further possible to form the support plates 40 by using other material such as a rigid plastic, and the like.

Moreover, this embodiment shows the first plate-like member 21 and the second plate-like member 31, each of which functions as the first support portion and the second support portion. On the other hand, it is possible that the entire first hub member 20 is integrally formed by the press forming, and the entire second hub member 30 can also be formed integrally by the press forming.

In this case, a position where the notches 21d and the holes 21e are provided in the first hub member 20 functions as the first support portion, and a position where the notches 31d and the holes 31e are provided in the second hub member 30 functions as the second support portion. In this case also, each of the support plates 40 is supported by the first and the second support portions so that the support shafts 41, 42 are arranged between the first and the second support portions in a direction which is along the rotation axis line 1a.

And, this embodiment shows a configuration in which a part of the support plate 40 is inserted into the notch and the hole and they are fixed by welding and the like, however, it is also possible to fix a part of the support plate 40 to the first and the second plate-like members 21, 31 by another method.

Moreover, it is possible that each of the support plates supports one roller 51 or one roller 52, and more than three rollers 51 or the rollers 52 can be supported by each of the support plates 40.

Also, this embodiment shows that the inner peripheral surface and the outer peripheral surface of the shock absorbing member 13 are respectively fixed to the inner ring and the other ring 12 by the adhesion, however, it is possible that the inner peripheral surface and the outer peripheral surface of the shock absorbing member 13 are not fixed to the inner ring 11 and the outer ring 12, and it is also possible to use a shock absorbing member 13 which is simply caught between the inner ring 11 and the outer ring 12.

In some of the conventional omnidirectional wheels, the number of support members or support frames to be provided corresponds to the number of rollers. Also, the support member or the support frame is formed by cutting a metal block, and the support member or the support frame has a thickness dimension which is thick enough to endure shocks applied to the rollers, therefore, when a plurality of the support members or the support frames are provided, the omnidirectional wheel gets heavy.

On the other hand, in some conventional omnidirectional wheels, rollers are supported by means of a plurality of plate-like members which radially extends from a hub radially outwardly. However, since the plate-like members are a member of which radial inner end is fixed to an outer peripheral surface of the hub, and which extends radially outwardly, it is likely that the plate-like members are bent or deformed when force is applied to a radial outer end of the plate-like members. For example, when a vehicle passes over a step in such a state where a weight of a passenger, a luggage, and the like are added, one or two of the rollers collide with the step, and at this time, together with force in a radial direction, force in a vehicle width direction and force in vehicle front-rear direction are also applied, therefore, the plate-like members are deformed easily in the conventional omnidirectional wheels.

The following aspects of the above disclosure have been made considering the aforementioned circumstances. An object of the aspects is to provide an omnidirectional wheel capable of achieving weight reduction and maintaining strength.

A first aspect derived from the above disclosure is an omnidirectional wheel whose outer peripheral surface is formed by a plurality of rollers and which rotates around a rotation axis line, the omnidirectional wheel comprising: a first support portion which rotates around the rotation axis line; a second support portion which is arranged at a position apart from the first support portion in a direction along the rotation axis line and which rotates around the rotation axis line together with the first support portion; a plurality of support shafts which support the plurality of rollers, respectively; and, a plurality of support plates which are fixed to the first support portion and the second support portion, and at least a part of each support plate is positioned between the first support portion and the second support portion in a direction along the rotation axis line, wherein, one or more of the support shafts are fixed to each of the support plates, in each of the support plates, at least one of an outer end in a wheel radial direction of a first fixing portion which is fixed to the first support portion and an outer end in the wheel radial direction of a second fixing portion which is fixed to the second support portion is positioned outside in the wheel radial direction with respect to an inner end in the wheel radial direction of a support-plate-side end portion of the support shaft which is fixed to the support plate.

In the first aspect, the first support portion and the second support portion are arranged at an interval in a direction which is along the rotation axis line, and the support shafts are supported between the first and the second support portions by the support plates, which is advantageous for suppressing deformation of each of the support plates in a vehicle width direction, which is caused by force applied to each of the rollers, and is also advantageous for suppressing deformation of the wheel in a rotational direction around the radial direction.

Also, at least one of the outer end in the wheel radial direction of the first fixing portions of each of the support plates and that of the second fixing portion of each of the support plates are positioned outside in the wheel radial direction with respect to the inner end in the wheel radial direction at the support-plate-side end portion in the support shafts which are fixed to each of the support plates, which is advantageous for suppressing deformation of the support plates in the rotation direction around an axis line extending in the vehicle width direction, which is caused by the force applied to each of the rollers. The above described configuration is advantageous for making the plate thickness of the support plates thinner.

A second aspect of the present invention is an omnidirectional wheel whose outer peripheral surface is formed by a plurality of rollers and which rotates around a rotation axis line, the omnidirectional wheel comprising: a first support portion which rotates around the rotation axis line; a second support portion which is arranged at a position apart from the first support portion in a direction along the rotation axis line and which rotates around the rotation axis line together with the first support portion; a plurality of support shafts which support the plurality of rollers, respectively; and, a plurality of support plates which are fixed to the first support portion and the second support portion, and at least a part of each support plate is positioned between the first support portion and the second support portion in a direction along the rotation axis line, wherein, one or more of the support shafts are fixed to each of the support plates, in each of the support plates, a central position in a wheel radial direction of a first fixing portion which is fixed to the first support portion is positioned outside in the wheel radial direction with respect to an outer end in the wheel radial direction of a second fixing portion which is fixed to the second support portion.

In the second aspect, the first and the second support portions are arranged at an interval in the direction along the rotation axis line, and each of the support shafts is supported between the first and the second support portion by the support plates, which is advantageous for suppressing the deformation of each of the support plates in the vehicle width direction, which is caused by the force applied to each of the rollers, and is also advantageous for suppressing the deformation of each of the support plates in the rotation direction around the wheel radial direction.

Also, since the first fixing portion is positioned outside in the wheel radial direction with respect to the second fixing portion, a position in the wheel radial direction of a support-plate-side end portion in the support shafts which are fixed to each of the support plates can get closer to or the same as a position in the wheel radial direction of the first fixing portion. This configuration is advantageous for suppressing the deformation of each of the support plates in the rotation direction around the axis line extending in the vehicle width direction, which is caused by the force applied to each of the rollers.

In the above described aspects, a position in the wheel radial direction of an inner end in the wheel radial direction of the first fixing portion and a position in the wheel radial direction of the outer end of the second fixing portion may substantially be the same.

With this configuration, the first fixing portion is positioned outside in the radial direction with respect to the second fixing portion more obviously, which is advantageous for suppressing the deformation of each of the support plates in the rotation direction about the axis line extending along the vehicle width direction, which is caused by the force applied to each of the rollers.

In the above described aspects, it is preferable that the first support portion is a plate-like member which is provided with a hole at a center thereof, and the second portion is plate-like member, and an outer peripheral shape of the second support portion is smaller than the hole of the first support portion.

With this configuration, it is possible to form the first and the second support portions by press forming, and at that time, the second support portion can be formed by using a plate material which is punched out for producing the hole at the center of the first support portion. Therefore, it is possible to reduce an amount of an end material and to provide an efficient manufacturing method.

In the above described aspects, it is preferable that the first support portion is positioned inside in the vehicle width direction with respect to the second support portion.

When the position in the radial direction of the support-plate-side end portion in the support shafts which are fixed to the support plate gets closer to or the same as the position in the radial direction of the first fixing portion, the first fixing portion and the support shafts of the rollers are arranged side by side in a direction along the rotation axis line of the wheel. That is to say, the support shafts of each of the rollers and the first fixing portion are arranged side by side in the vehicle width direction.

In this state, when the first fixing portion is positioned outside in the vehicle direction, in such a case where the omnidirectional wheel comes into contact with an obstacle positioned outside in the width direction, the first fixing portion comes into contact with the obstacle before the rollers. On the other hand, when the second fixing portion is positioned inside in the radial direction with respect to the position in the radial direction of the support-plate-side end portion in the support shafts which are fixed to the support plate, the second fixing portion can be arranged so as not to be side by side with the support shafts of each of the rollers in the direction along the rotation axis line of the wheel.

That is to say, it is possible to arrange the second fixing portion inside in the vehicle width direction with respect to each of the rollers. With this configuration, the second fixing portion is positioned outside in the vehicle width direction, therefore, in such a case where the omnidirectional wheel comes into contact with the obstacle which is positioned outside in the width direction, it is possible to prevent the second fixing portion from coming into contact with the obstacle as much as possible before the rollers.

In the above described aspects, it is preferable that a shock absorbing member is provided between an axle which rotatably supports the omnidirectional wheel around the rotation axis line, and the first support portion and the second support portion.

With this configuration, the shock absorbing member reduces vibration generated between a contact surface and each of the rollers, and the like, and the reduced vibration is transmitted to the axle, which is advantageous for reducing the vibration of the vehicle.

With the above described aspects, it is preferable that the first support portion is a plate-like member having a fixed portion for fixing the first fixing portion, the plate-like member is formed together with a resin member by insert molding, and the resin member is supported by an outer portion of the shock absorbing member.

As described above, since the first support portion is the plate-like member and is formed together with the resin member, and the resin member is supported by the outer portion of the shock absorbing member, in such a case where the first support portion is made from a metal so as to enhance strength, weight of the omnidirectional wheel can be reduced by using the resin member.

According to the above aspects, it is possible to achieve weight reduction and maintain strength.

The invention claimed is:

1. An omnidirectional wheel whose outer peripheral surface is formed by a plurality of rollers and which rotates around a rotation axis line, the omnidirectional wheel comprising:
   a first support portion which rotates around the rotation axis line;
   a second support portion which is arranged at a position apart from the first support portion in a direction along the rotation axis line and which rotates around the rotation axis line together with the first support portion;
   a plurality of support shafts which support the plurality of rollers; and
   a plurality of support plates which are fixed to the first support portion and the second support portion, wherein
   one or more of the support shafts are fixed to each of the support plates,
   one end of each of the support plates in a direction along the rotation axis line is provided with a first fixing portion, and the other end of each of the support plates in the direction along the rotation axis line is provided with a second fixing portion.

2. The omnidirectional wheel according to claim 1, wherein the second support portion is provided with a plurality of holes arranged in a circumferential direction of the omnidirectional wheel at intervals, and
   the second fixing portion of each of the support plates is inserted into a corresponding hole among the plurality of holes.

3. The omnidirectional wheel according to claim 1, wherein the second support portion is provided with a plurality of holes arranged in a circumferential direction of the omnidirectional wheel at intervals, and a periphery of the second support portion is provided with a plurality of notches arranged in the circumferential direction with intervals,
   wherein the second fixing portion of each of the support plates is inserted into a corresponding hole among the plurality of holes and a corresponding notch among the plurality of notches.

4. The omnidirectional wheel according to claim 1, wherein the first support portion is provided with a plurality of holes arranged in a circumferential direction of the omnidirectional wheel at intervals, and
   the first fixing portion of each of the support plates is inserted into a corresponding hole among the plurality of holes of the first support portion.

5. The omnidirectional wheel according to claim 1, wherein the first support portion is provided with a plurality of holes arranged in a circumferential direction of the omnidirectional wheel at intervals, and a periphery of the first support portion is provided with a plurality of notches arranged in the circumferential direction with intervals,
  wherein the first fixing portion of each of the support plates is inserted into a corresponding hole among the plurality of holes of the first support portion and a corresponding notch among the plurality of notches of the first support portion.

6. The omnidirectional wheel according to claim 5, wherein the one end of each of the support plates in the direction along the rotation axis line is provided with, as the first fixing portion, two protruding portions which are apart from each other in a wheel radial direction.

7. The omnidirectional wheel according to claim 3, wherein the other end of each of the support plates in the direction along the rotation axis line is provided with, as the second fixing portion, two protruding portions which are apart from each other in a wheel radial direction.

8. The omnidirectional wheel according to claim 1, wherein the first fixing portion is fixed to the first support portion by welding.

9. The omnidirectional wheel according to claim 1, wherein the second fixing portion is fixed to the second support portion by welding.

10. The omnidirectional wheel according to claim 1, wherein the first support portion has a ring shape.

11. The omnidirectional wheel according to claim 1, wherein the second support portion has a ring shape.

12. The omnidirectional wheel according to claim 1, wherein each of the support shafts protrude from a surface of the support plate along a thickness direction of the support plate.

13. The omnidirectional wheel according to claim 1, wherein the plurality of rollers includes first rollers and second rollers whose diameter is larger than that of the first rollers,
  wherein each of the support plates is supporting a pair of the first rollers or a pair of the second rollers,
  the pair of the first rollers and the pair of the second rollers are alternatively arranged in a circumferential direction of the omnidirectional wheel.

14. The omnidirectional wheel according to claim 1, wherein the each of the support plates is formed through a punching process.

15. The omnidirectional wheel according to claim 1, wherein a periphery of the first support portion has a polygonal shape,
  the plurality of rollers includes first rollers and second rollers whose diameter is larger than that of the first rollers,
  wherein each of the support plates supports a pair of the first rollers or a pair of the second rollers,
  the pair of the first rollers and the pair of the second rollers are alternatively arranged in a circumferential direction of the omnidirectional wheel,
  radial positions of the first fixing portion and the second fixing portion of the support plate which supports the pair of second rollers are respectively positioned at radially inside positions relative to the first fixing portion and the second fixing portion of the support plate which supports the pair of the small rollers in a wheel radial direction.

16. The omnidirectional wheel according to claim 1, wherein at least a part of each support plate is positioned between the first support portion and the second support portion.

17. The omnidirectional wheel according to claim 1, wherein the first support portion is positioned inside the second support portion in a vehicle-width direction,
  wherein the second support portion does not protrude from the rollers in the vehicle-width direction.

18. The omnidirectional wheel according to claim 1, wherein in each of the support plates, at least one of an outer end in a wheel radial direction of the first fixing portion which is fixed to the first support portion and an outer end in the wheel radial direction of the second fixing portion which is fixed to the second support portion is positioned outside in the wheel radial direction with respect to an inner end in the wheel radial direction of a support-plate-side end portion of the support shaft which is fixed to the support plate.

19. An omnidirectional wheel according to claim 1, wherein in each of the support plates, a central position in a wheel radial direction of the first fixing portion which is fixed to the first support portion is positioned outside in the wheel radial direction with respect to an outer end in the wheel radial direction of the second fixing portion which is fixed to the second support portion.

20. The omnidirectional wheel according to claim 18, wherein a position of an inner end in the wheel radial direction of the first fixing portion and a position in the wheel radial direction of the outer end of the second fixing portion are substantially the same in the wheel radial direction.

21. The omnidirectional wheel according to claim 18, wherein the first support portion is a plate-like member having a hole provided at a center thereof, and the second support portion is a plate-like member, and
  an outer peripheral shape of the second support portion is smaller than the hole of the first support portion.

22. The omnidirectional wheel according to claim 18, wherein the first support portion is positioned inside in a vehicle width direction with respect to the second support portion.

23. The omnidirectional wheel according to claim 18, wherein a shock absorbing member is provided between an axle which rotatably supports the omnidirectional wheel around the rotation axis line, and the first support portion and the second support portion.

24. The omnidirectional wheel according to claim 23, wherein the first support portion is a plate-like member having a fixed portion for fixing the first fixing portion, and the plate-like member is joined to a resin member by insert molding, and
  the resin member is supported by an outer portion of the shock absorbing member.

* * * * *